No. 823,884. PATENTED JUNE 19, 1906.
A. C. LINDGREN.
VALVE MECHANISM FOR SEED PLANTERS.
APPLICATION FILED MAR. 22, 1906.

2 SHEETS—SHEET 1.

Witnesses:

Inventor:
A. C. Lindgren
By P. T. Dodge
Attorney

No. 823,884. PATENTED JUNE 19, 1906.
A. C. LINDGREN.
VALVE MECHANISM FOR SEED PLANTERS.
APPLICATION FILED MAR. 22, 1906.
2 SHEETS—SHEET 2.

Witnesses
Sidney P. Hollingsworth
L. E. Morrison

Inventor;
A. C. Lindgren
By P. T. Dodge Attorney.

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

VALVE MECHANISM FOR SEED-PLANTERS.

No. 823,884.   Specification of Letters Patent.   Patented June 19, 1906.

Application filed March 22, 1906. Serial No. 307,386.

*To all whom it may concern:*

Be it known that I, ALEXUS C. LINDGREN, of Moline, county of Rock Island, and State of Illinois, have invented a new and useful Improvement in Valve Mechanism for Seed-Planters, of which the following is a specification.

This invention relates more particularly to the valve mechanism of seed-planters for controlling the passage of the seed from the hopper to the ground; and the invention consists of a valve mechanism of improved construction designed with the view of adapting the machine to be used either to deposit the seed at intervals, as in hills, or continuously, as in drilling.

My improved valve mechanism is situated, as usual, in the runner-shank and comprises a movable seed conductor or tube and a coöperating valve, which parts are adapted by their coöperation to effect the planting of the seed in hills, means being provided for adjusting the conductor at will, so that it will be unobstructed by the valve and an uninterrupted passage will be presented for the discharge of the seed continuously into the ground, as in drilling.

Figure 1:
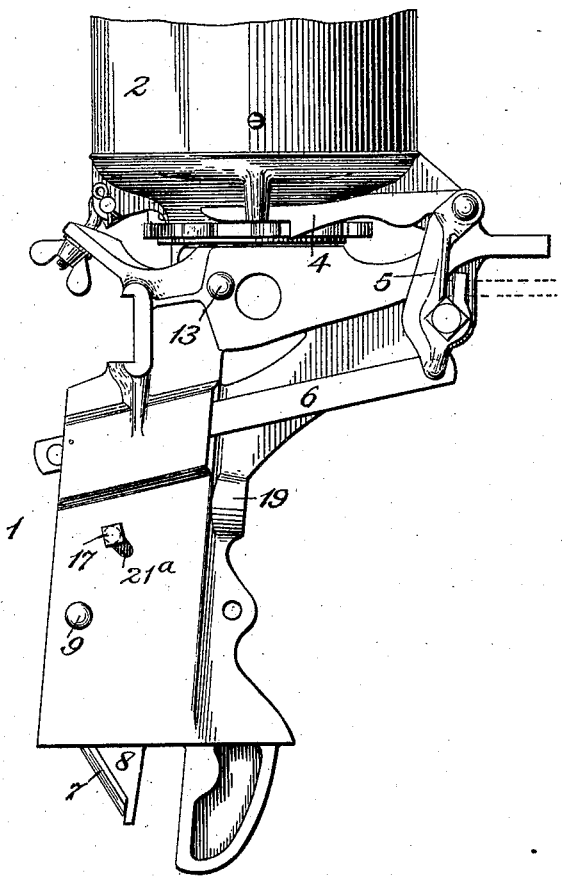
Figure 6:
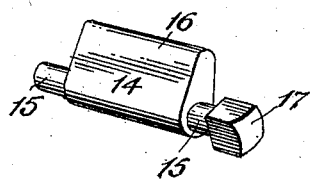
Figure 2:
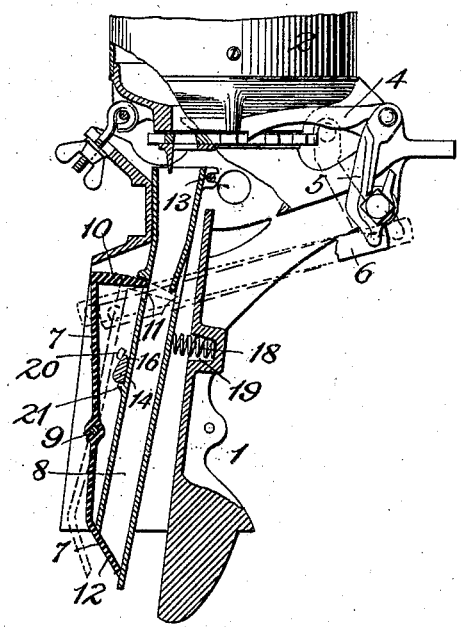
Figure 4:
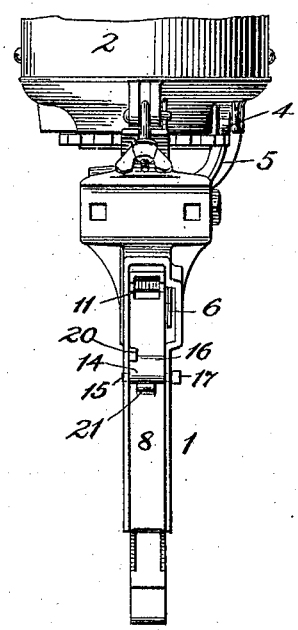
Figure 3:
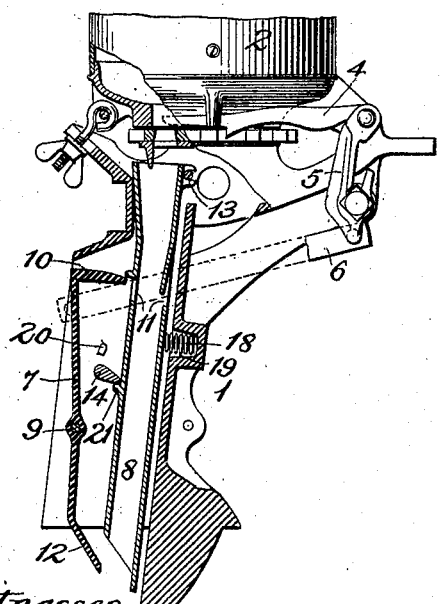
Figure 5:
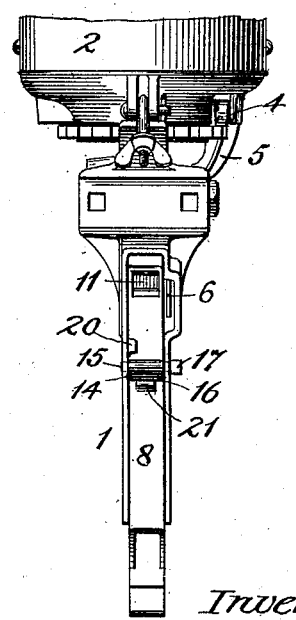

In the accompanying drawings, Figure 1 is a side elevation of the runner-shank and seed-hopper of a corn-planting machine having my invention embodied therein. Fig. 2 is a vertical longitudinal sectional elevation of the same with the seed-conductor in the position it occupies when it coöperates with the valve in planting the seed in hills. Fig. 3 is a similar view with the conductor adjusted to form an unobstructed passage for the seed in drilling. Fig. 4 is a rear elevation of the seed-conductor and its adjusting device, the latter being in an inactive position. Fig. 5 is a similiar view showing the adjusting device in its active position and maintaining the conductor free of coöperation with the valve, and Fig. 6 is a perspective view of the conductor-adjusting device removed.

Referring to the drawings, 1 represents a runner or seed-conductor shank surmounted, as usual, by a seed-hopper 2, provided with a seed-discharging mechanism comprising a horizontal rotary seed-plate containing cells to receive the corn from the hopper and direct it into the upper end of the runner-shank, means being provided, as will be more fully described latter on, for either turning the seed-plate at intervals when the machine is to be used as a "hill-drop" or for turning the plate continuously when the machine is used for drilling.

When used as a hill-drop, the seed-plate may be actuated by a driving-pawl 4, adapted to engage the teeth on the seed-plate and carried on the upper end of a rocking arm 5, actuated by the check-fork mechanism, (not shown,) the lower end of the arm being connected with the forward end of a link 6, operatively connected at its opposite end with the valve mechanism in the runner-shank, the throw of the driving-pawl acting on the seed-plate in such manner as to periodically discharge into the upper end of the runner-shank a number of kernels to form a hill, usually three, and the valve mechanism acting to accumulate these kernels in charges and deposits them into the ground.

The valve mechanism comprises a valve proper, 7, and a coöperating vertical seed conductor or tube 8, the latter extending within the runner-shank, with its upper end in position to receive the seed discharged from the hopper. The valve proper is in the form of a narrow plate or casting arranged in an upright position and pivoted between its ends between the walls of the runner-shank in rear of the seed-conductor on a horizontal transverse axis 9, a lip 10 being extended forwardly from the upper end of the plate and adapted to extend through openings 11 in the seed-tube and a finger 12 being projected forwardly from its lower end and adapted to extend across and close the lower end of the seed-tube, the said finger and lip acting alternately when the valve is rocked on its axis to extend across and close the seed-tube at its upper and lower ends, respectively, in such manner that the kernels discharged into the tube from the hopper are first accumulated in the tube on the lip 10, whence they drop to the bottom of the tube, where they are held by finger 12 and finally dropped into the ground.

The rocking of the valve is effected by the link 6, before alluded to, which has its rear end jointed to the valve near its upper end, so that when the driving-pawl is operated to turn the seed-plate by the rearward throw of the check-fork (not shown) the valve will be rocked on its axis and the lip 10 projected into the seed-tube in position to receive the seed discharged from the hopper, the finger 12 by the same action being moved rearward and opening the lower end of the tube, thereby allowing the previously-accumulated charge to enter the ground. On the return of the check-fork the seed-plate remains at rest and the valve is thrown rearward at its upper end, thereby withdrawing the lip 10 from the seed-tube and projecting the finger 12, with the result that the kernels at the upper end of the tube will be dropped and caught at the lower end, ready to be deposited into the ground when the seed-plate is again operated to feed another charge of kernels into the tube.

In drilling the seed into the ground its passage through the conductor should of course be continuous and free from interruption by the valve, and to provide for this action I so sustain the conductor that it may be adjusted or set at will in such position relatively to the valve that the passage-way through the conductor will be unobstructed by either the lip or finger of the valve. This is conveniently effected by hanging or sustaining the conductor at its upper end on a transverse axis or pin 13, mounted in the runner-shank in such manner that the tube may be swung forward from the position it occupies in Fig. 2, where it coöperates with the valve, to the position shown in Fig. 3, where it is free of coöperation with the valve and the passage-way through the tube is uninterrupted. The adjustment of the tube is effected by a locking-dog 14, formed with journals 15, mounted in bearings in the walls of the runner-shank in rear of the seed-tube and provided between the walls with a finger 16, adapted when the dog is turned in its bearings to engage the tube and swing the same forward, one of the journals being extended to the outside of the shank, where it is provided with a squared head 17 for turning the dog. The tube is acted on by a spiral spring 18, seated in a socket 19 in the runner-shank in front of the tube and bearing at its rear end against the same, which spring tends to hold the tube yieldingly in its rearward position, as shown in Fig. 2, in which position of the parts the finger on the dog stands in an upright position and rests against a stop 20, which limits the rearward movement of the tube and controls its operative relation to the valve. When the dog is turned forward to adjust the tube free of the valve, the finger thereon engages the tube and urges the same forward until the motion of the finger is arrested by a projection 21 on the tube, so arranged that it will act to lock the finger against further movement on its axis, and the tube will be held fixedly in its forward position free of coöperation with the valve.

The relation of the tube to the valve is such that when the former it in its rearward coöperating position it will stand at an inclination rearward and when adjusted forwardly it will stand in a truly vertical position, with the result that the seed may fall by gravity directly into the ground, with no liability of striking against the sides of the tube.

It is understood, of course, that in converting the machine from a hill-drop to a drill there is substituted for the seed-plate used in a hill-drop a gear-plate, which latter is driven by operative connections from the ground-wheels, (not shown,) or other means may of course be employed for this purpose, the only requirement being that the seed be discharged from the hopper continuously and not periodically. In the specific form of operating mechanism for hill-dropping here shown it is the practice when the machine is converted for drilling to disconnect the valve proper, 7, from its operating mechanism and throw the upper end of the same rearward to the position shown in Fig. 2, with the lip 10 withdrawn from the conductor 8, and to substitute for the pawl-driven seed-plate a gear-driven seed-plate.

In order to provide for the assembling of the parts, more particularly the adjusting-dog, the wall of the runner-shank is formed, as shown in Fig. 1, at one side with a slot or opening 21 communicating with the journal-opening, which slot is of a size and form to permit the finger 16 on the dog to pass therethrough, so that the dog may be set in place by inserting the same laterally through this slot and then turning it upward behind the seed-tube. In order to prevent the dog from escaping accidentally or when it is turned forward to its extreme position in adjusting the tube, the slot is disposed slightly beyond the locking position of the finger, and in removing or inserting the dog in place the tube is forced forward to such position that the stop projection thereon will be free of the end of the finger 16, the relation of the tube to the shank being such as to permit of this abnormal position of the tube when the dog is to be inserted or removed.

Having thus described my invention, what I claim is—

1. In a seed-planter, the combination of seed-discharging mechanism, a rearwardly-inclined movable seed-conductor, a valve adapted when the lower end of said conductor is in its rearward position to coöperate therewith for "hill-dropping," and means for adjusting said lower end of the conductor forward to a vertical position free of coöperation with the valve, for drilling.

2. In a seed-planter the combination of seed-discharging mechanism, a seed-conductor hung at its upper end to swing forward, a valve coöperating with the conductor when the latter is in its rear position, a spring acting to retain the conductor in its rear position, and an adjusting device for retaining the conductor in its forward position.

3. In a seed-planter, the combination of seed-discharging mechanism, a runner-shank, a seed-conductor mounted therein on a transverse axis and provided on its rear side with a stop projection, a spring sustained by the runner-shank and bearing on the front side of the conductor and tending to hold the same yieldingly in its rearward position, and an adjusting-dog mounted in the runner-shank and formed with a finger adapted to engage the conductor and coöperate with the stop projection thereon.

4. In a seed-planter, the combination of seed-discharging mechanism, a runner-shank, a seed-conductor therein, movable back and forth, an adjusting-dog mounted in the runner-shank on a transverse axis in rear of the conductor and formed with a finger adapted to engage the conductor and move the same forward, a turning-head on the dog situated at the outside of the shank, and a valve adapted to coöperate with the conductor when in its rearward position.

5. In a seed-planter, the combination of seed-discharging mechanism, a runner-shank, a seed-conductor mounted near its upper end in the shank on a horizontal axis, an adjusting-dog mounted in the shank on a horizontal transverse axis and in rear of the conductor, a finger on the dog adapted when the latter is turned on its axis, to engage and urge the conductor forward, and a projection on the conductor in position to be engaged by the finger when the latter is turned forward.

6. In a seed-planter, the combination of seed-discharging mechanism, a runner-shank, a seed-conductor mounted therein and movable back and forth, a spring acting on the conductor and holding the same yieldingly in its rearward position, an adjusting-dog mounted in the shank and formed with a swinging finger adapted when turned forward to engage and urge the conductor forward, and a stop on the shank adapted to be engaged by the finger and limit the rearward movement of the conductor.

7. In a seed-planter, the combination of seed-discharging mechanism, a movable seed-conductor in position to receive the seed from the discharging mechanism, a valve adapted to alternately close and open the lower end of the conductor for "hill-dropping," and means for adjusting the lower end of the conductor free of coöperation with said valve, for drilling.

In testimony whereof I hereunto set my hand, this 8th day of February, 1906, in the presence of two attesting witnesses.

ALEXUS C. LINDGREN.

Witnesses:
L. C. BLANDING,
THOS. J. MARSHALL.